(12) United States Patent
Saaroni et al.

(10) Patent No.: US 10,860,459 B2
(45) Date of Patent: Dec. 8, 2020

(54) DYNAMICALLY DETERMINED ADAPTIVE TIMEOUT VALUE FOR DETECTING GRAPHICAL USER INTERFACE ELEMENT OF APPLICATION UNDERGOING FUNCTIONAL TESTING

(71) Applicant: ENTIT Software LLC, Sanford, NC (US)

(72) Inventors: Dror Saaroni, Yahud (IL); Avishay Ben Shabtai, Holon (IL); Anton Kaminsky, Yehud (IL); Vika Milgrom, Yehud (IL); Yossi Rachelson, Petach Tikwa (IL)

(73) Assignee: MICRO FOCUS LLC, Santa Clara, CA (US)

( * ) Notice: Subject to any disclaimer, the term of this patent is extended or adjusted under 35 U.S.C. 154(b) by 79 days.

(21) Appl. No.: 16/211,850

(22) Filed: Dec. 6, 2018

(65) Prior Publication Data

US 2020/0183810 A1    Jun. 11, 2020

(51) Int. Cl.
  *G06F 9/44*   (2018.01)
  *G06F 11/36*  (2006.01)
  *G06F 9/451*  (2018.01)

(52) U.S. Cl.
  CPC .......... *G06F 11/3608* (2013.01); *G06F 9/451* (2018.02); *G06F 11/3664* (2013.01)

(58) Field of Classification Search
  CPC ... G06F 11/3608; G06F 9/451; G06F 11/3664
  USPC ....................................................... 717/125
  See application file for complete search history.

(56) References Cited

U.S. PATENT DOCUMENTS

| | | | |
|---|---|---|---|
| 6,421,793 B1 * | 7/2002 | Lester ................ | G06F 11/2733 714/37 |
| 7,437,614 B2 | 10/2008 | Haswell et al. | |
| 8,392,886 B2 * | 3/2013 | Sweis ..................... | G06F 8/74 717/125 |
| 8,850,400 B2 | 9/2014 | Shrivastava et al. | |
| 8,965,961 B1 * | 2/2015 | Roskind ................ | H04L 43/08 709/203 |
| 9,098,632 B2 | 8/2015 | Cook | |
| 2006/0026560 A1 * | 2/2006 | Kornerup .............. | G06F 9/4881 717/113 |

(Continued)

OTHER PUBLICATIONS

Title: nternet flow characterization: adaptive timeout strategy and statistical modeling , author: B Ryu et al, published on 1984.*

(Continued)

*Primary Examiner* — Chameli Das

(57) ABSTRACT

An adaptive timeout value for a script operation associated with functional testing of an application is determined. The script operation specifies detecting display of a specific graphical user interface (GUI) element by the application. The adaptive timeout value is dynamically determined based on prior functional testing of the application. Responsive to encountering the script operation within a script while functionally testing the application under direction of the script, waiting occurs until display of the specific GUI element by the application has been detected, or until timing out has occurred in correspondence with the dynamically determined adaptive timeout value.

18 Claims, 3 Drawing Sheets

(56) References Cited

U.S. PATENT DOCUMENTS

2009/0089004 A1 4/2009 Vook et al.
2012/0144373 A1* 6/2012 Cook .................. G06F 11/3668
  717/125

OTHER PUBLICATIONS

QTP Synchronization, TutorialsPoint, online < https://www.tutorialspoint.com/gtp/gtp_synchronization.htm >, accessed from web.archive.org as archieved on Nov. 7, 2017.

Tuli, V., "Adding Exist/Wait Statements and Modifying Timeout Values in QTP Tool in Testing", online < https://www.c-sharpcorner.com/UploadFile/face6d/adding-existwait-statements-and-modifying-timeout-values-in/ >, retrieved May 22, 2018, published Jul. 18, 2012.

How to Synchronize Test Cases, Wisdom IT Services India Pvt. Ltd., online < https://www.wisdomjobs.com/e-university/testing-tools-tutorial-239/how-to-synchronize-test-cases-14539.html >, copyright 2018.

Unified Functional Testing 11.5, online <http://uft11-5.blogspot.in/2013/11/synchronization-in-uft-115.html>, Nov. 10, 2013.

* cited by examiner

DYNAMICALLY DETERMINED ADAPTIVE TIMEOUT VALUE FOR DETECTING GRAPHICAL USER INTERFACE ELEMENT OF APPLICATION UNDERGOING FUNCTIONAL TESTING

BACKGROUND

Computing devices can run user-focused applications in which users interact with graphical user interface (GUI) elements that the applications display to cause the applications to perform desired functionality. Such applications can include those that execute on the same computing devices on which users interact with the applications, like applications running on computing devices such as smartphone, tablet, and more traditional laptop and desktop computing devices. The applications can further include those that primarily execute on one computing device, like a server computing device, and with which users interact via another computing device, like a client computing device that may be a smartphone, tablet, or a more traditional computing device. The latter applications can include web applications, or web apps, which can run within web browser programs on the client side.

DETAILED DESCRIPTION

Figure 1A:
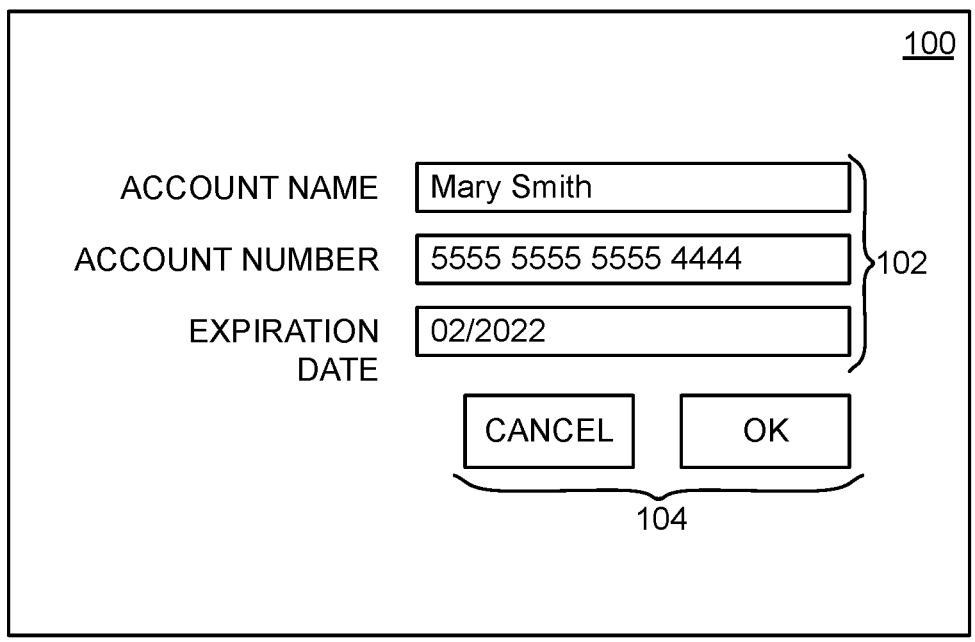
FIGS. 1A and 1B are diagrams of illustrative example depiction of an application undergoing automated functional testing.

As noted in the background, in user-focused applications, users interact with graphical user interface (GUI) elements that the applications display to cause the applications to perform desired functionality. There are a large variety of different GUI elements that applications can employ. As non-exhaustive examples, GUI elements may include text boxes that a user can select and enter text in, radio buttons and dropdown list boxes that permit the user to select an option from a number of different options corresponding to the buttons and list box items, respectively, and checkboxes that permit the user to select multiple options corresponding to the boxes. As other non-exhaustive examples, GUI elements can include toggle switches that permit the user to select from two options, and action buttons that the users can affirmatively select to perform actions like submit, cancel, and so on.

Development of user-focused applications thus concerns permitting users to interact with GUI elements displayed by the applications so that the users can perform desired functionality. Before applications are deployed to end users, they may be rigorously tested so that, for instance, the applications perform the correct functionality, including displaying the correct GUI elements at the correct times. Shrinking development cycles means that testing has to be performed within shorter periods of time. Meanwhile, applications have tended to increase in complexity, while user patience for bugs and other operational flaws in application execution has decreased, particularly with the increasing number of applications that are available to end users.

An approach to managing these constraints is to perform automated functional testing of an application. The testing is functional in that it determines whether an application operates correctly. The testing is automated in that it can be performed without tester (i.e., human) intervention or interaction during testing. For example, unautomated functional testing can involve testers who interact with an application as end users are expected to, to verify that the application is operating correctly. Automated functional testing involves a computing device itself interacting with an application, simulating user input in relation to the GUI elements as if a human end user were interacting with the application, to verify that the application is operating correctly.

Automated functional testing of an application thus can entail a script of ordered actions that are to be performed in relation to the GUI elements that the application displays. Each action can include two parts. First, the action can identify a particular GUI element of the application. Second, the action can specify the operation that should be performed in relation to the GUI element. Therefore, a computing device performing automated functional testing of an application proceeds through the script. For a given action of the script, the computing device detects the GUI element identified by the script action as displayed by the application, and may then responsively perform an operation in relation to the GUI element once it has been detected. If the GUI element is not detected, then automated functional testing may prematurely terminate with an indication that the application is not performing correctly (i.e., testing has failed). Detection of a GUI element identified by an action in a script can be performed in a number of different ways.

Once a (first) action has been performed in relation to a detected GUI element displayed by the application, the script may specify that another (second) action be performed. This second action likewise may identify a GUI element of the application that is to be detected, and an operation that should be performed in relation to the GUI element in question. If the application is not functioning correctly, or if the script has not be updated to reflect modified but still correct functioning of the application, the application may not, after the first action has been performed, display the GUI element of the second action that functional testing is attempting to detect. In another situation, there may be a delay after the first action is performed before the application displays the GUI element of the second action that testing is attempting to detect, due to temporary processing or communication issues.

When functional testing of an application encounters a script action requesting detection of a GUI element (in relation to which, for instance, an operation may then be performed), it may proceed in one of two ways. First, the testing may wait for a length of time before even attempting to detect the GUI element. For instance, the script itself may include a hardcoded wait action in between the first and second actions noted above, such that the functional testing explicitly waits for a defined length of time before proceeding to the second action and attempting to detect the GUI element. This approach can result in unnecessarily slow functional testing, however.

For example, the script may specify that a length of time be waited after the operation of the first action is performed before the functional testing proceeds to the second action and detects whether the application has displayed the GUI element of the second action. However, if the application displayed the GUI element of the second action in a fraction of this length of time after the first action's operation was performed, the functional testing will have been slowed by the remainder of the specified length of time. That is, the functional testing will not even attempt to detect the GUI element until after the entire specified length of time has elapsed.

A second way in which functional testing of an application can proceed is to have a timeout value associated with a script action that concerns detecting a GUI element. There may be a default timeout value for all actions of the script, which may be overridden on a per-action basis, for instance. When functional testing encounters the script action, it begins detecting whether the application has displayed the GUI element in question. If the GUI element is detected before a length of time equal to the timeout value has elapsed, then functional testing proceeds, such as by performing a script-specified operation in relation to this GUI element.

For example, the script may specify a timeout value equal to a particular length of time. When functional testing of an application encounters a script action calling for detection of a GUI element, the testing immediately begins detecting whether the application has displayed the GUI element. If the application displays the GUI element in a fraction of the particular length of time specified by the timeout value, the GUI element is detected and functional testing immediately continues, without having to wait for the entire length of time. As such, functional testing performance is not unnecessarily slowed, because the entire length of time does not have to be waited.

A shortcoming with this approach is appropriately setting the timeout value, however. If the timeout value is set too low, the functional testing of an application will fail and prematurely terminate even though the application may be performing correctly but running a bit slower than usually due to the server or other computing device executing the application being temporarily overloaded. That is, the functional testing may have specified a timeout value of X seconds; if it takes the application X+0.1 seconds to display the GUI element in question, functional testing will nevertheless have already timed out detection of the GUI element, and thus fail and prematurely terminate.

By comparison, if the timeout value is set too high, the functional testing of an application may wait an inordinately long time before failing and prematurely terminating. For example, specifying a timeout value as a number of hours, or even tens of minutes, can virtually guarantee that the functional testing will not incorrectly fail and prematurely terminate, since in all likelihood if the application is going to display the GUI element in question, it will within this length of time. However, if the application is not performing correctly and will not ever display the GUI element, waiting hours of even tens of minute inordinately slows functional testing by effectively delaying premature termination and failure of such testing until timing out has occurred.

Disclosed herein are techniques that employ a dynamically determined adaptive timeout value for detecting a GUI element of an application undergoing functional testing. An adaptive timeout value for a script operation associated with functional testing of an application is determined. The adaptive timeout value is dynamically determined based on prior functional testing of the application. The timeout value is thus adaptive in that it can compensate for changes in execution time of the application over successive functional testing iterations, accommodating temporary slowdowns that may result from momentary communication bottlenecks and short processing backlogs. Determination of the timeout value is dynamic in that the timeout value is not preset, at least once the application has been functionally tested a number of times, and further changes over successive functional testing iterations.

Therefore, the techniques employed herein do not employ a static timeout value for detecting a GUI element of an application undergoing functional testing. The techniques thus mitigate the concerns associated with having to preset the timeout value. The techniques avoid having to set a prematurely low timeout value that favors functional testing performance over testing accuracy, or a prematurely high timeout value that favors functional testing accuracy over testing performance. Functional testing of the application does not wait for the adaptive timeout value to fully elapse upon detecting that the application has displayed the GUI element in question.

Figure 1B:
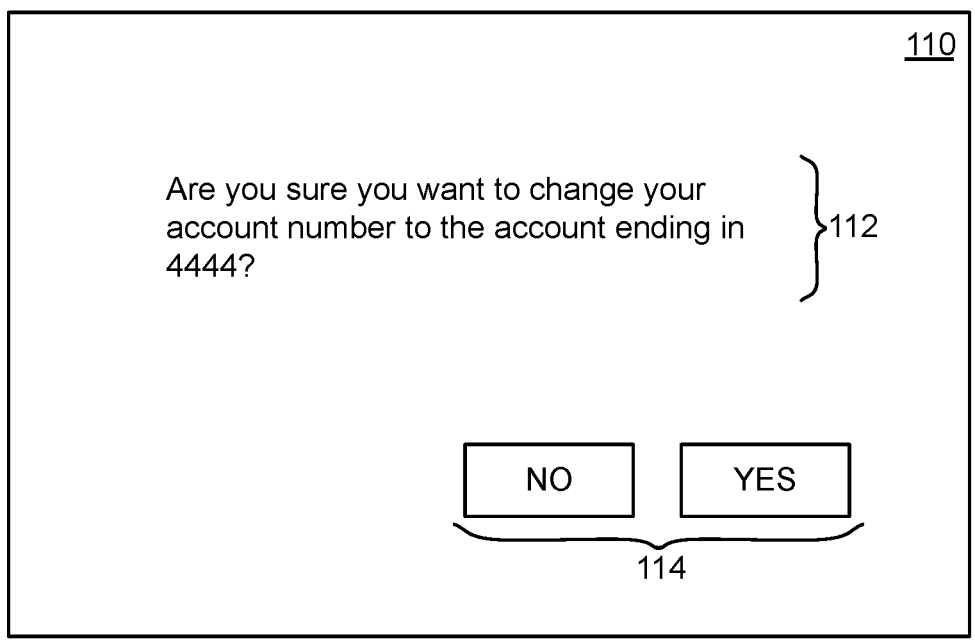

FIGS. 1A and 1B illustratively depict an example of an application undergoing functional testing. The application may be a web application, or web app, or another type of application. In the specific example of FIGS. 1A and 1B, the application may be undergoing functional testing at least in part to ensure that the application correctly performs account maintenance functionality. For instance, a user may have an account, such as a financial account by which he or she pays for goods or services, which can be modified. In the example of FIGS. 1A and 1B, the functionality by which the user can change details regarding the account is tested.

In FIG. 1A, the application undergoing testing displays a screen 100 including text box GUI elements 102 and button GUI elements 104. The text box GUI elements 102 include associated labels "account name," "account number," and "expiration date," that identify the information that is to be input into the text boxes. Functional testing thus involves simulating user selection of each text box, and entering in data, such as "Mary Smith," "5555 3555 3555 4444," and "02/2022" within the text boxes. The button GUI elements 104 include an OK button and a cancel button. Functional testing can therefore further involve, after simulating user entry of data into the text boxes of the GUI elements 102, simulating user selection of the OK button.

Then, in FIG. 1B, the application undergoing testing responsively displays a screen 110 on which the text "Are you sure you want to change your account number to the account ending in 4444?" is displayed. The application also displays the button GUI elements 114, which includes a yes button and a no button. Functional testing can thus involve, after having selected the OK button on the screen 100 in FIG. 1A, simulating user selection of the yes button on the screen 110 in FIG. 1B.

A script directs such automated functional testing of an application, and as has been noted, can include a series of ordered actions. In relation to the screen 100 of FIG. 1A, the script may include the following actions:

SELECT TEXT BOX WITH LABEL "Account Name"
ENTER "Mary Smith"
PRESS TAB KEY
ENTER "5555 3555 3555 4444"
PRESS TAB KEY
ENTER "02/2022"
SELECT OK BUTTON In relation to the screen 110 of FIG. 1B, the script may include the following actions:

SELECT YES BUTTON

The foregoing example is specifically a pseudo-code representation of script operations. Automated application functional testing scripts may in actuality be written in a number of different script formats, such as Java, JavaScript, and Visual Basic Script (VBScript), for instance.

A computing device functionally testing an application in an automated manner may thus perform the series of actions of the script. A script action that directs the computing device to perform functionality in relation to a GUI element effectively causes the computing device to first detect whether the application has displayed the GUI element on the screen, and then perform the specified functionality in relation to the GUI element if the element has been detected. If the computing device cannot detect that the application has displayed the GUI element on the screen, then the device may prematurely terminate and fail functional testing of the application.

As a specific example, once the automated functional testing has selected the OK button in relation to FIG. 1A, the testing detects whether the application has displayed the yes button per FIG. 1B so that this button can be selected. If the application undergoing automated functional testing is operating incorrectly, or if the script has not been updated to account for modified but correct operation of the application, the application may never display the yes button. For example, the application may have "locked up," such that due to a software or a hardware failure, the application does not display the yes button. As another example, the application may have been modified to no longer display the screen 110 of FIG. 1B that includes the yes button, such that the application is nevertheless operating correctly but will never display the yes button. In these instances, the automated functional testing should ultimately prematurely terminate and fail, but without waiting too long before doing so.

By comparison, if the application undergoing automated functional testing is operating correctly and as expected by the script directing the functional testing, the application will display the yes button. However, normal communication and processing delays can result in the length of time that elapses between selection of the OK button in FIG. 1A and display of the yes button in FIG. 1B varying. Automated functional testing should not prematurely terminate and fail in these instances. That is, the functional testing should wait sufficiently long that it will not prematurely time out when detecting whether the application displayed the OK button.

Figure 2:
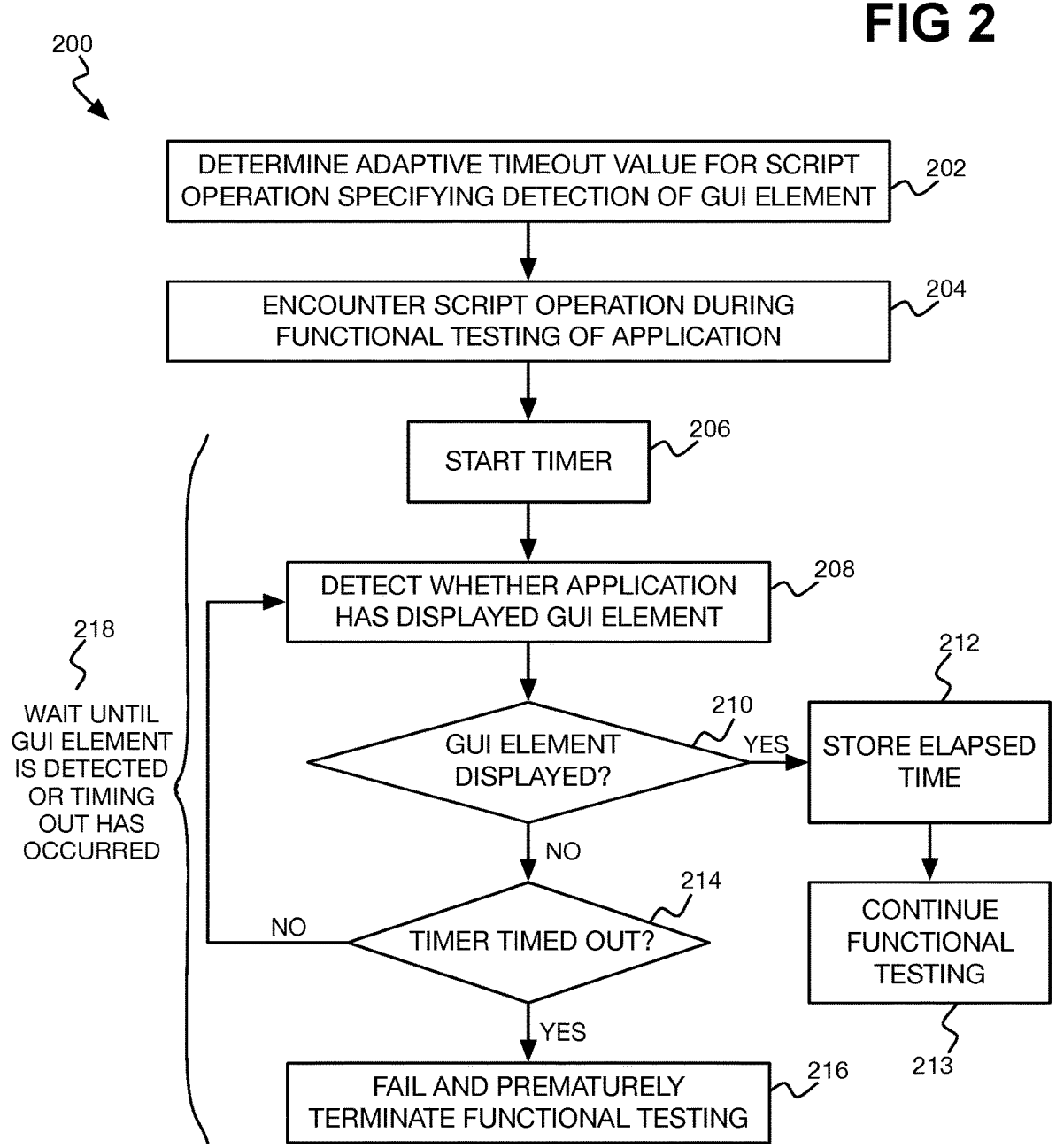
FIG. 2 is a flowchart of an example method for detecting whether an application undergoing automated functional testing has displayed a graphical user interface (GUI) element.

FIG. 2 shows an example method 200 for detecting a GUI element of an application undergoing functional testing. A computing device functionally testing the application can perform the method 200. The method 200 may be implemented as program code stored on a non-transitory computer-readable data storage medium and executed by the computing device. The method 200 may be performed as part of functional testing of the application as directed by a script.

The computing device determines an adaptive timeout value for a script operation that specifies detection of the GUI element (202), based on prior functional testing of the application. The adaptive timeout value can be specific to the application that will be or that is undergoing functional testing, or may be a default timeout value that is not specific to any application. The adaptive timeout value can be specific to a particular GUI element, or may be a default value that is not specific to any GUI element. The adaptive timeout value can be specific to a particular script action of a script, or may be a default value that is not specific to any particular script action of the script.

As noted above, the adaptive timeout value compensates for changes in execution of the application over successive iterations of the functional testing of the application. The adaptive timeout value is thus not preset, and changes over such successive iterations. The adaptive timeout value may be determined each time the functional testing of the application is initiated, such that for every such iteration, the adaptive timeout value is determined once. In another implementation, the adaptive timeout value can be determined each time a GUI element is to be detected if the value is specific to the GUI element, or each time a script action is encountered if the value is specific to the script action.

The adaptive timeout value is determined based on the length of time that elapsed before the computing device detected that the application displayed the GUI element, in each of a number of prior iterations of the functional testing of the application. For instance, when the computing device functionally testing the application encounters a script operation associated with the GUI element, the device begins detecting whether the application has displayed the GUI element. The time that elapses between when the computing device begins detecting whether the application has displayed the GUI element and when the device actually detects that the application has displayed the GUI element is thus tracked.

The number of prior iterations on which basis the adaptive timeout value is determined can be a specified number, such as the last five, ten, and so on, iterations, or all the prior iterations of functional testing of the application. The adaptive timeout value may be determined as a function of the length of time that elapsed before the computing device detected that the application displayed the GUI element in each of these prior iterations. For instance, the function may be a mean, median, or another function. The function may be a percentage over the mean or median, such as ten or twenty percent over the mean or median. The function may further have a maximum limit, such that regardless of the mean or medium, the adaptive timeout value cannot exceed an upper limit.

As one particular example, the adaptive timeout value may be determined as $$atv_i = \min\left(\frac{\sum_{x=i-N}^{x=i-1} t_x}{N}, upper\right).$$

Here, $atv_i$ is the adaptive timeout value for the current iteration i. The adaptive timeout value is set to the minimum of two values. The first value, $$\frac{\sum_{x=i-N}^{x=i-1} t_x}{N},$$

is the mean of the length of time $t_x$ that elapsed before the computing device detected that the application displayed the GUI element in each of the immediate N prior iterations X=i−N . . . i−1. The second value, upper, is a constant, and is the upper limit that the adaptive timeout value cannot exceed regardless of the determined mean.

In other implementations, of the N most recent iterations, the iteration having the longest length of time $t_x$ and the iteration having the shortest length of time $t_x$ may not be considered when determining the adaptive timeout value. That is, these two lengths of time may be considered outliers, and may be discarded so as not to affect the adaptive timeout value. In such implementations, the actual number of prior iterations that are considered is thus N−2.

During functional testing of the application as directed by a script, the computing device performing the functional testing encounters a script operation that is associated with a GUI element that the application should display next (204). Therefore, the computing device has to detect the GUI element before, for instance, the device can perform the script operation in relation to the GUI element. The computing device starts a timer (206) corresponding to the adaptive timeout value. For example, the timer may be a countdown timer that is set to the adaptive timeout value. The computing device then continually attempts to detect the display of the GUI element by the application, until the GUI element has been detected or until the timer has timed out (e.g., has counted down to zero). The latter situation thus corresponds to the script operation having timed out in accordance with the adaptive timeout value.

More specifically, then, the computing device detects whether the application has displayed the GUI element (208). The computing device may detect whether the application has displayed the GUI element by property values, by image, or in another manner. Detection can be successful or unsuccessful. If the computing device does not successfully detect the GUI element (210), and if the timer has not yet timed out (214), then the device continues with its detection attempts in part 208 until the GUI element is successfully detected or until the timer has timed out.

If the application has displayed the GUI element and this display is successfully detected (210), the computing device functionally testing the application can store the length of time that elapsed between starting the timer in part 206 and when the GUI element was successfully detected in part 208 (212). This elapsed time can then be used to update the adaptive timeout value. For example, when the method 200 is performed for the next iteration of the functional testing of the application, the adaptive timeout value can be determined in part 202 based on this recorded elapsed time, as well as the elapsed times recorded in prior iterations. The computing device can then continue functionally testing the application (213), such as by performing the script operation that was encountered in part 204.

However, if the computing device never detects that the application undergoing functional testing has displayed the GUI element (210) prior to the timer timing out (214), then the device fails and prematurely terminates the functional testing (216). As such, the computing device effectively waits until the GUI element is detected or until timing out has occurred (218). Per the method 200, the computing device does not have to wait for the adaptive timeout value to fully elapse upon successfully detecting display of the specific GUI element prior to timing out having occurred.

Figure 3A:
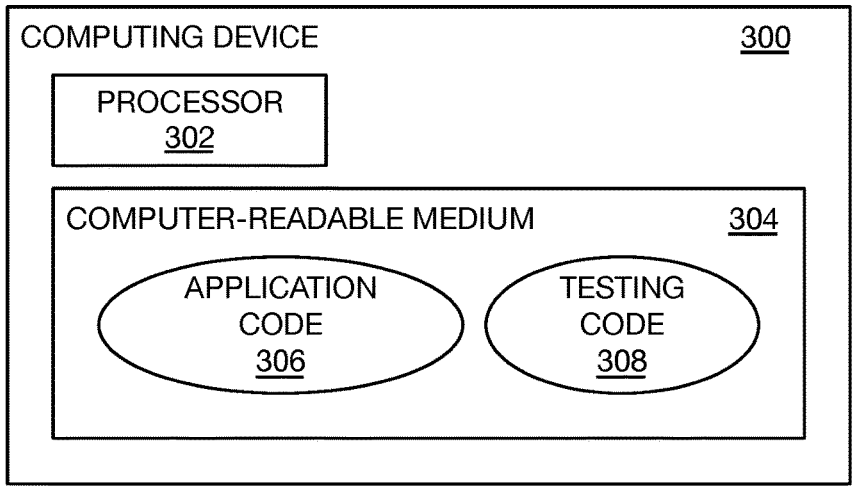
FIG. 3A is a diagram of an example computing device.
Figure 3B:
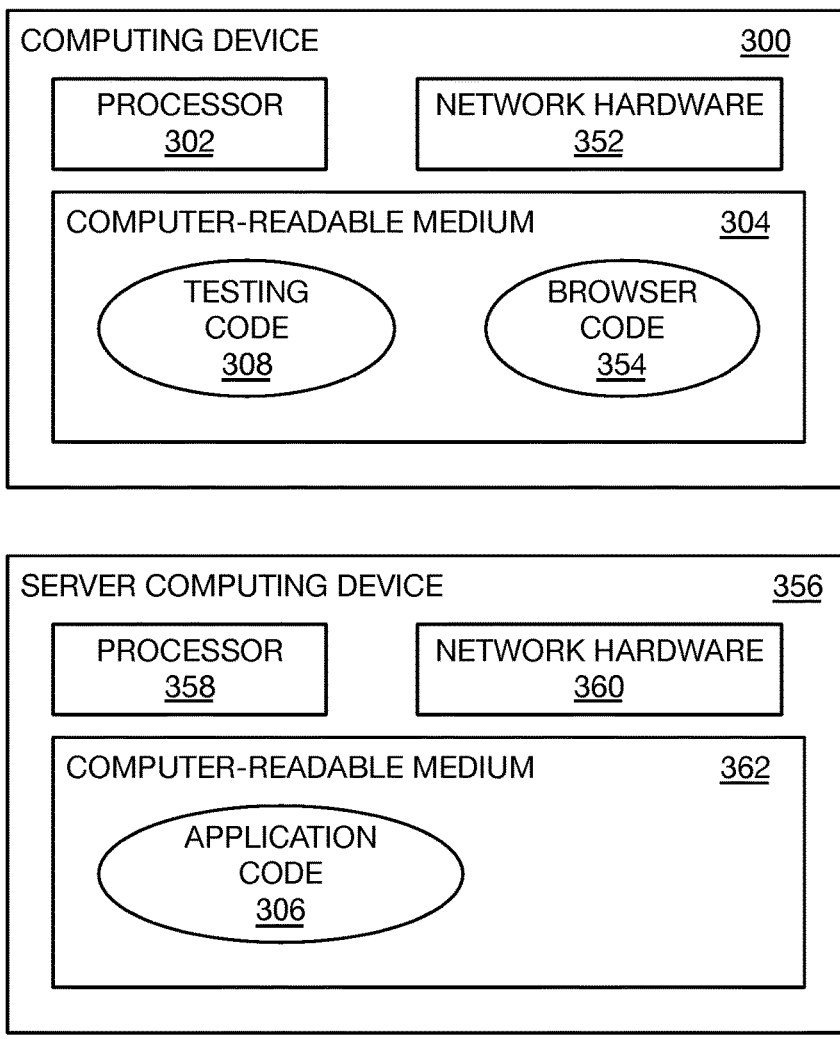
FIG. 3B is a diagram of an example system including an example computing device.

FIGS. 3A and 3B show two example implementations of a computing device 300. The computing device 300 in each implementation includes a processor 302 and a non-transitory-computer readable medium 304 that stores program code executable by the processor 302. In FIG. 3A, the program code includes application code 306 and testing code 308. The processor 302 functionally tests the application forming the application code 306, via the testing code 308. That is, execution of the testing code 308 functionally tests, in an automated manner, the application of the application code 306. The testing code 308 may thus implement the methods that have been described.

Whereas in FIG. 3A the same computing device 300 runs both the application code 306 (and therefore the application) and the testing code 308 that tests the application, in FIG. 3B the computing device 300 does not. In the implementation of FIG. 3B, the program code includes the testing code 308 and also browser code 354. The application is instead executed by a server computing device 356, which like the computing device 300 includes a processor 358 and a non-transitory computer-readable medium 362 that stores the application code 306 that the processor 358 executes.

The computing device 300 interacts with the server computing device 356 while the server computing device 356 executes the application of the application code 306, providing input to and receiving output from the server computing device 356. As such, the computing device 300 and the server computing device 356 respectively include network hardware, like wired or wireless network adapters, to communicate with one another over a network, such as the Internet. The testing code 308 provides input to the application of the application code 306 via a web browser program of the browser code 354. The testing code 308 similarly receives output from the application via the web browser program, which the web browser program may display at the computing device 300.

The techniques that have been described improve automated functional testing of an application, such as a web application, under development. The performance and robustness of such testing are particularly improved, by compensating for changes in execution of the application over successive functional testing iterations. The techniques specifically provide for dynamic determination of an adaptive timeout value that governs how long to wait for the application to display a GUI element before concluding that the GUI element will not be displayed. Such a dynamically determined adaptive timeout value thus can compensate for temporary decreases in execution performance of the application by automatically, for instance, gradually increasing the timeout value so long as the timeout value does not exceed an upper limit. The timeout value does not have to be manually preset, nor set artificially low or high.

We claim:

1. A method comprising:
   determining, by a computing device, an adaptive timeout value for a script operation associated with functional testing of an application, the script operation specifying detecting display of a specific graphical user interface (GUI) element by the application, the adaptive timeout value dynamically determined based on a length of time that elapsed before the computing device detected that the application displayed the specific GUI element in each of a number of prior iterations of the functional testing of the application; and
   responsive to encountering the script operation within a script while the computing device is functionally testing the application under direction of the script, waiting, by the computing device, until the computing device has detected that the application has displayed the specific GUI element or until timing out has occurred in correspondence with the dynamically determined adaptive timeout value without having detected that the application has displayed the specific GUI element.

2. The method of claim 1, wherein the adaptive timeout value is adaptive in that the adaptive timeout value compensates for changes in execution of the application over successive iterations of the functional testing of the application.

3. The method of claim 1, wherein determination of the adaptive timeout value is dynamic in that the adaptive timeout value is not preset and changes over successive iterations of the functional testing of the application.

4. The method of claim 1, wherein the computing device does not wait for the adaptive timeout value to have fully elapsed upon detecting that the application has displayed the specific GUI element prior to the timing out having occurred in correspondence with the dynamically determined adaptive timeout value.

5. The method of claim 1, wherein the adaptive timeout value is dynamically determined based further on a length of time that elapsed before the computing device detected that the application displayed the specific GUI element in every prior iteration of the functional testing of the application.

6. The method of claim 1, wherein the adaptive timeout value is dynamically determined based on the length of time that elapsed before the computing device detected that the application displayed the specific GUI element in each of the number of prior iterations of the functional testing of the application by computing a function of the length of time that elapsed before the computing device detected that the application displayed the specific GUI element in each of the number of prior iterations of the functional testing of the application.

7. The method of claim 6, wherein the adaptive timeout value is dynamically determined based on the length of time that elapsed before the computing device detected that the application displayed the specific GUI element in each of the number of prior iterations of the functional testing of the application by further computing the function of a length of time that elapsed before the computing device detected that the application displayed the specific GUI element in every prior iteration of the functional testing of the application.

8. The method of claim 1, further comprising:
upon the timing out having occurred in correspondence with the dynamically determined adaptive timeout value, failing and prematurely terminating, by the computing device, the functional testing of the application.

9. The method of claim 1, further comprising:
upon detecting that the application has displayed the specific GUI element prior to the timing out having occurred in correspondence with the dynamically determined adaptive timeout value, continuing, by the computing device, the functional testing of the application.

10. The method of claim 1, further comprising:
upon detecting that the application has displayed the specific GUI element prior to the timing out having occurred in correspondence with the dynamically determined adaptive timeout value, storing, by the computing device, a length of time that elapsed before the computing device detecting that the application displayed the specific GUI element, on which basis the adaptive timeout value is determined in a next iteration of the functional testing of the application.

11. A computing system comprising:
a processor; and
a non-transitory computer-readable storage medium storing program code executable by the processor to functionally test an application as directed by a script, including associating a dynamically determined adaptive timeout value with a script operation of the script specifying detecting display of a specific graphical user interface (GUI) element by the application,
wherein the program code dynamically determines the adaptive timeout value based on a length of time that elapsed before display of the specific GUI element by the application has been detected in each of a number of prior iterations of the functional testing of the application,
and wherein responsive to encountering the script operation within the script while functionally testing the application, the program code attempts to detect the display of the specific GUI element by the application until the specific GUI element has been detected or until the script operation has timed out in accordance with the adaptive timeout value without having detected the specific GUI element.

12. The computing system of claim 11, wherein dynamic determination of the adaptive timeout value permits the functional testing of the application to compensate for temporary decreases in execution performance of the application over successive iterations of the functional testing of the application.

13. The computing system of claim 11, wherein the program code is executable by the processor to further:
at initiation of functional testing of the application under direction of the script, dynamically determine the adaptive timeout value based on the number of prior iterations of the functional testing of the application.

14. The computing system of claim 11, wherein the adaptive timeout value is dynamically determined based a specified number of most recent iterations of the functional testing of the application.

15. The computing system of claim 14, wherein the adaptive timeout value is dynamically determined also based on another specified number of the prior iterations of the functional testing of the application less than the specified number of the most recent iterations.

16. The computing system of claim 14, wherein the program code is executable by the processor to further:
in response to successfully detecting the display of the specific GUI element by the application prior to timing out of the script operation, continue the functional testing of the application.

17. The computing system of claim 14, wherein the program code is executable by the processor to further:
in response to the script operation timing out prior to successful detection of the display of the specific GUI element by the application, fail and prematurely terminate the functional testing of the application.

18. A non-transitory computer-readable data storage medium storing program code executable by a computing device to:
determine an adaptive timeout value for a script operation associated with functional testing of an application, the script operation specifying detecting display of a specific graphical user interface (GUI) element by the application, the adaptive timeout value dynamically determined based on a length of time that elapsed before the computing device detected that the application displayed the specific GUI element in each of a number of prior iterations of the functional testing of the application;
while the application undergoes the functional testing according to a script, encounter the script operation within the script;
responsive to encountering the script operation, start a timer and detect whether the application has displayed the specific GUI element;
in response to successfully detecting that the application has displayed the specific GUI element, continue the functional testing of the application;

in response to unsuccessfully detecting that the application has displayed the specific GUI element, fail and prematurely terminate the functional testing of the application if the timer has timed out in correspondence with the dynamically determined adaptive timeout value; and in response to unsuccessfully detecting that the application has displayed the specific GUI element, continue to detect whether the application has displayed the specific GUI element if the timer has not timed out yet.

* * * * *